United States Patent
Miyamoto et al.

[11] Patent Number: 6,024,817
[45] Date of Patent: Feb. 15, 2000

[54] METHOD AND APPARATUS FOR JOINING TOGETHER THE OPPOSITE ENDS OF A BELT-SHAPED MEMBER

[75] Inventors: Yoshinori Miyamoto; Hidemasa Sato; Jiro Agawa, all of Nagasaki; Keizo Yamashita; Toshinari Matsumoto, both of Hiratsuka, all of Japan

[73] Assignee: Yokohama Rubber Company, Ltd., Japan

[21] Appl. No.: 09/041,138

[22] Filed: Mar. 12, 1998

Related U.S. Application Data

[60] Division of application No. 08/719,366, Sep. 25, 1996, Pat. No. 5,779,850, which is a continuation-in-part of application No. 08/432,941, May 1, 1995, abandoned.

[30] Foreign Application Priority Data

May 11, 1994 [JP] Japan .................................. 6-97588

[51] Int. Cl.[7] .................................................. B29D 30/30
[52] U.S. Cl. .................... 156/130; 156/128.1; 156/405.1
[58] Field of Search .................................. 156/123, 130, 156/133, 128.1, 134, 304.1, 304.5, 405.1, 406.4, 406.6

[56] References Cited

U.S. PATENT DOCUMENTS

| | | |
|---|---|---|
| 2,679,178 | 5/1954 | Odin . |
| 3,290,039 | 12/1966 | Lancaster . |
| 4,470,866 | 9/1984 | Satoh et al. . |
| 4,804,426 | 2/1989 | Okuyama et al. . |
| 4,983,243 | 1/1991 | Nakano et al. . |
| 5,292,398 | 3/1994 | Miyamoto et al. . |

FOREIGN PATENT DOCUMENTS

| | | |
|---|---|---|
| 4035708 | 5/1991 | Germany . |
| 59-207227 | 11/1984 | Japan . |
| 60-79938 | 7/1985 | Japan . |
| 62-236728 | 10/1987 | Japan . |
| 03061031 | 3/1991 | Japan . |
| 03061032 | 3/1991 | Japan . |
| 3190725 | 8/1991 | Japan . |
| 3218818 | 9/1991 | Japan . |
| 9002382 | 11/1990 | Netherlands . |

*Primary Examiner*—Geoffrey L. Knable
*Attorney, Agent, or Firm*—Rothwell, Figg, Ernst & Kurz, p.c.

[57] ABSTRACT

A belt-shaped member cut into a predetermined length is fed from a feeding devices to a tire forming drum and is wound on its cylindrical peripheral surface. Center portions of the opposite ends of the belt-shaped member are pushed to be joined to each other and the side portions of at least one of the opposite ends of the belt-shaped member are held by upper and lower holding pawls. Such holding pawls are swung along an arcuate path so that both side portions of the opposite ends of the belt-shaped member are drawn near each other to abut against each other. The abutting end portions are pushed toward the peripheral surface of the drum by pushing devices for joining them together.

4 Claims, 4 Drawing Sheets

METHOD AND APPARATUS FOR JOINING TOGETHER THE OPPOSITE ENDS OF A BELT-SHAPED MEMBER

CROSS-REFERENCE TO RELATED APPLICATION

This application is a divisional of U.S. Ser. No. 08/719,366, filed Sept. 25, 1996, now U.S. Pat. No. 5,779,850, which is a continuation-in-part of U.S. Ser. No. 08/432,941, filed May 1, 1995 (abandoned).

FIELD OF THE INVENTION AND RELATED ART STATEMENT

The present invention relates to a method and apparatus for joining together the opposite ends of a belt-shaped member. More specifically, the present invention relates to a method and apparatus for feeding a long, narrow member or belt-shaped member cut into a predetermined length, such as a tread, to a tire forming drum to wind the belt-shaped member on a cylindrical peripheral surface of the drum and joining together both opposite ends of the belt-shaped member.

The belt-shaped member therein considered is more particularly a non-vulcanized rubber constituent member of a raw tire, or more specifically a tire tread, the cross section of which is substantially trapezoidal-shaped and has a thick center portion provided with tapered side portions which outwardly end with thin side edges. Accordingly, when the belt-shaped member is cut into a predetermined length, both the side portions thereof shrink so that its cut end sections, the so-called starting and terminating ends, are curved.

Such a belt-shaped member is usually wound on the cylindrical peripheral surface of a tire forming drum by using a tire forming machine and performing a known belt-shaped member affixing method (for example of the type disclosed in U.S. Pat. No. 5,292,398). However, when the center portion of the starting end and the center portion of the terminating end of the belt-shaped member are positioned in opposed orientation to be joined to each other, substantially V-shaped gaps form at both side portions of the belt-shaped member due to the aforesaid shrinkage of the side portions thereof.

In particular, in the case of the known belt-shaped member affixing method, an actual length of the belt-shaped member T (see annexed FIG. 5) is measured before affixing of the member T. The starting end of the belt-shaped member T is then adhered at a predetermined position of the tire forming drum and the terminating end of the belt-shaped member is fixed on a conveyor by a clamp manipulator. The peripheral speed of the tire forming drum and the moving speed of the conveyor are then adjusted to wind the belt-shaped member T on the peripheral surface of the tire forming drum while extending the belt-shaped member T to a required length, so that the center portion of its starting end and the center portion of its terminating end are positioned in opposed orientation to be joined together at point E of FIG. 5. According to this method, when the center portions of the starting and terminating ends are joined to each other, V-shaped gaps form at both side portions of the ends of the belt-shaped member T. The top and bottom side extensions of such V-shaped gaps are respectively indicated X1 and X2 in FIG. 5.

Accordingly, in the aforesaid belt-shaped member affixing method using the above tire forming machine, it is necessary to join by hand both the side portions (shrinkage portions) of the starting and terminating ends of the belt-shaped member while extending the belt-shaped member by the length of the shrinkage portions.

As a countermeasure for solving such a drawback, end portion joining methods for belt-shaped members have been proposed, for example by U.S. Pat. No. 4,804,426 or JP 3-190,725, in which holding pawls are used to hold both side portions of at least one of the starting end or the terminating end, such holding pawls being moved along the peripheral surface of the tire forming drum to relatively draw the side end portions of the starting end with respect to the side end portions of the terminating end in order to approach them so that the starting and the terminating ends of the belt-shaped member are positioned in opposed orientation to be joined to each other.

However, in the belt-shaped member end joining method according to the prior art, in consequence of the fact that the holding pawls are moved along the peripheral surface of the tire forming drum along a direction parallel to the belt-shaped member, the following problems arise.

If the width of the belt-shaped member to be held is wide, it does not succeed in exactly joining together the side portions of the starting and terminating ends. This is because of the reciprocal abutment of the center portions of the ends of the belt-shaped member, which impedes both side ends of the starting and terminating ends of the belt-shaped member from being joined together.

If the width of the belt-shaped member to be held is instead narrow, only the portions actually held by the holding pawls are extended, with the unheld portions in the vicinity of the held portions not being brought into engaging proximity. Thus, the starting and terminating ends of the belt-shaped member can not be joined exactly.

More specifically, the methods and apparatuses known from the prior art teach to use holding pawls which can be moved only along the cylindrical peripheral surface of the forming drum, that is only along the lengthwise direction of the belt-shaped member wound on it. Due to this fact, the reciprocal abutment of the central portions of the starting and terminating end sections of the belt-shaped member hinder the bringing into contact of the corresponding side portions of the starting and terminating ends. Thereby, the side V-shaped gaps which form between the starting and terminating ends can not be eliminated.

SUMMARY OF THE INVENTION

The present invention has been made in order to overcome the above problems, and provides a method and an apparatus allowing automatic and exact joining together of the opposite ends of a belt-shaped member, such as a tread.

The method according to the present invention is for joining together the opposite ends of a belt-shaped member. Each of the ends comprises a center portion interposed between two thinner side portions. The method includes the steps of feeding said belt-shaped member cut into a predetermined length from a feeding device to a tire forming drum having a cylindrical peripheral surface; winding said belt-shaped member on said cylindrical peripheral surface of said tire forming drum; pushing both end center portions of said opposite ends with respect to each other to join them together, thereby forming a pair of opposite substantially V-shaped side gaps between the side portions of the opposite ends of the belt-shaped member, said V-shaped side gaps having a respective vertex adjacent to the joined end center portions; holding both side portions of at least one of said opposite ends of the belt-shaped member by respective holding devices arranged in proximity of the V-shaped side gaps; swinging said holding devices each along an arcuate path the center of which is located adjacent, e.g., substantially in correspondence with, the vertex of the respective V-shaped gap, for bringing the side portions of both opposite ends of said belt-shaped member together until they abut against each other.

In accordance with the invention, the starting and terminating end sections of the belt-shaped member are brought into contact substantially over their whole width, so as to eliminate even wide V-shaped gaps formed between the side ends of the opposite ends of the belt-shaped member, notwithstanding the reciprocal abutment of the center portions of the end sections of the member.

The present invention further provides an apparatus for joining both ends of a belt-shaped member wherein each end comprises a center portion interposed between two thinner side portions, the belt-shaped member being cut into a predetermined length and being fed from a feeding device to a tire forming drum which is rotatable about an axis and has a peripheral cylindrical surface, wherein the belt-shaped member is wound on said peripheral cylindrical surface and the center portions of its opposite ends are joined, thereby forming a pair of opposite V-shaped side gaps between the side portions of the opposite ends of the belt-shaped member, said V-shaped side gaps each having a respective vertex adjacent to the joined end center portions. The apparatus according to the invention comprises a pair of moving rests adapted to be moved along both a radial direction and an axial direction with respect to said drum. Arms are connected to the moving rests. The arms are adapted to be swung about respective axes radially extending with respect to the axis of said drum and passing through a point located adjacent, e.g., in substantial proximity of said vertex of the V-shaped gaps. Holding devices are connected to said arms for holding and drawing together side end portions of said belt-shaped member.

DETAILED DESCRIPTION OF THE PREFERRED EMBODIMENTS

Referring now to FIGS. 1 to 4, an embodiment of a both ends joining apparatus for use in implementation of a method of joining the ends of a belt-shaped member, according to the present invention, is described.

Figure 1:
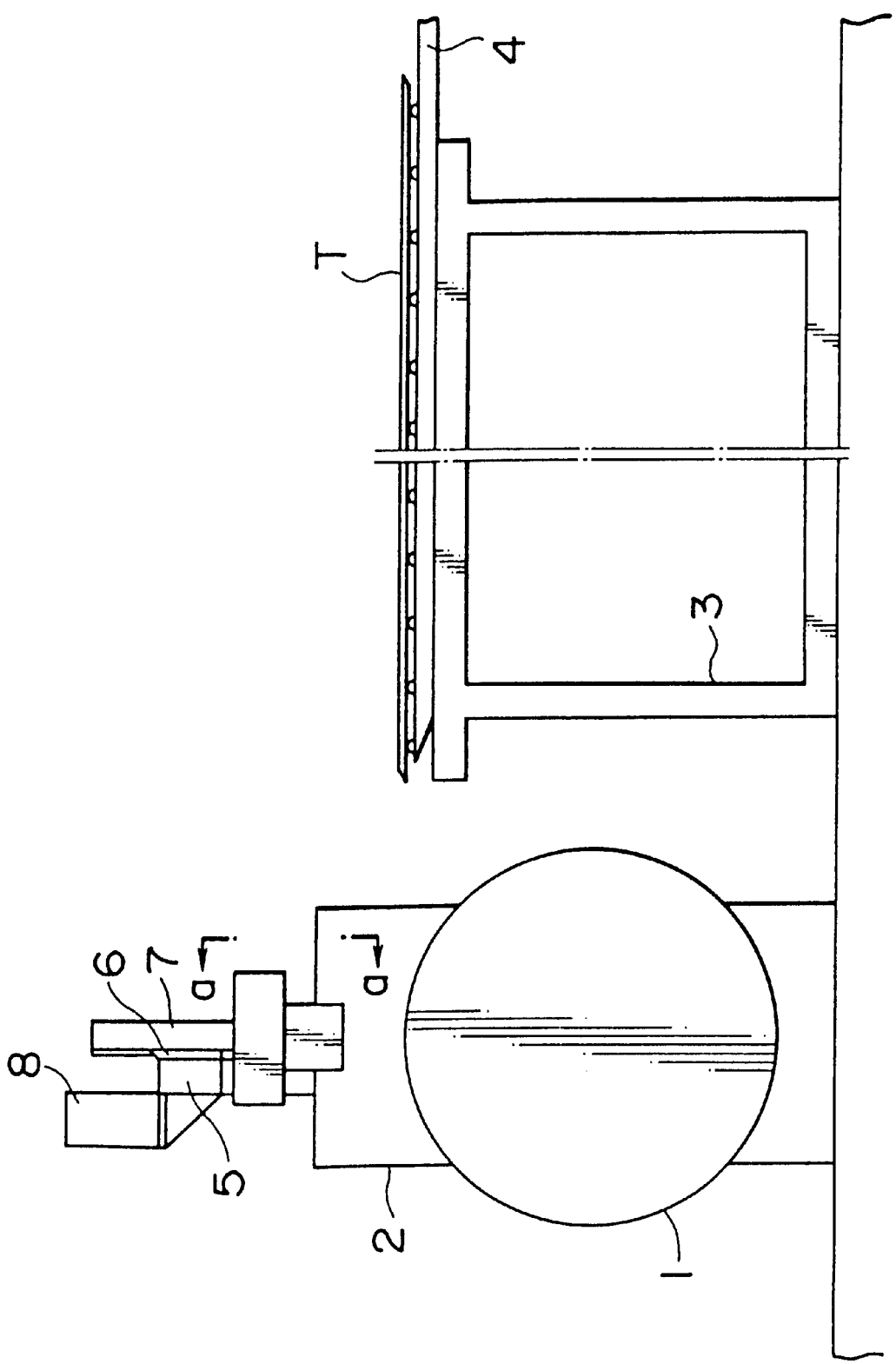
FIG. 1 is a side view showing an example of an apparatus for joining the opposite ends of a belt-shaped member, for use in implementation of a both ends joining method of the present invention.

In FIG. 1, numeral 1 denotes a tire forming drum having a cylindrical peripheral surface. A support and drive device 2 of the tire forming drum 1 is shown, as is a frame 3 for a device for feeding a belt-shaped member T as a tire tread, and a conveyor 4 for conveying the device for feeding the member T. Further, a centering device of the member T is provided, this centering device being well known in the art and therefore not shown.

Further, numeral 5 denotes a bracket of the both end sectional joining apparatus, which is fixedly mounted to the support and drive device 2, a motor 8 mounted to the bracket 5 by means of bolts, and a vertically moving base 7 which is slidably mounted to the bracket 5 along a radial direction with respect to the tire forming drum 1 through a directly driven bearing 6.

Figure 2:
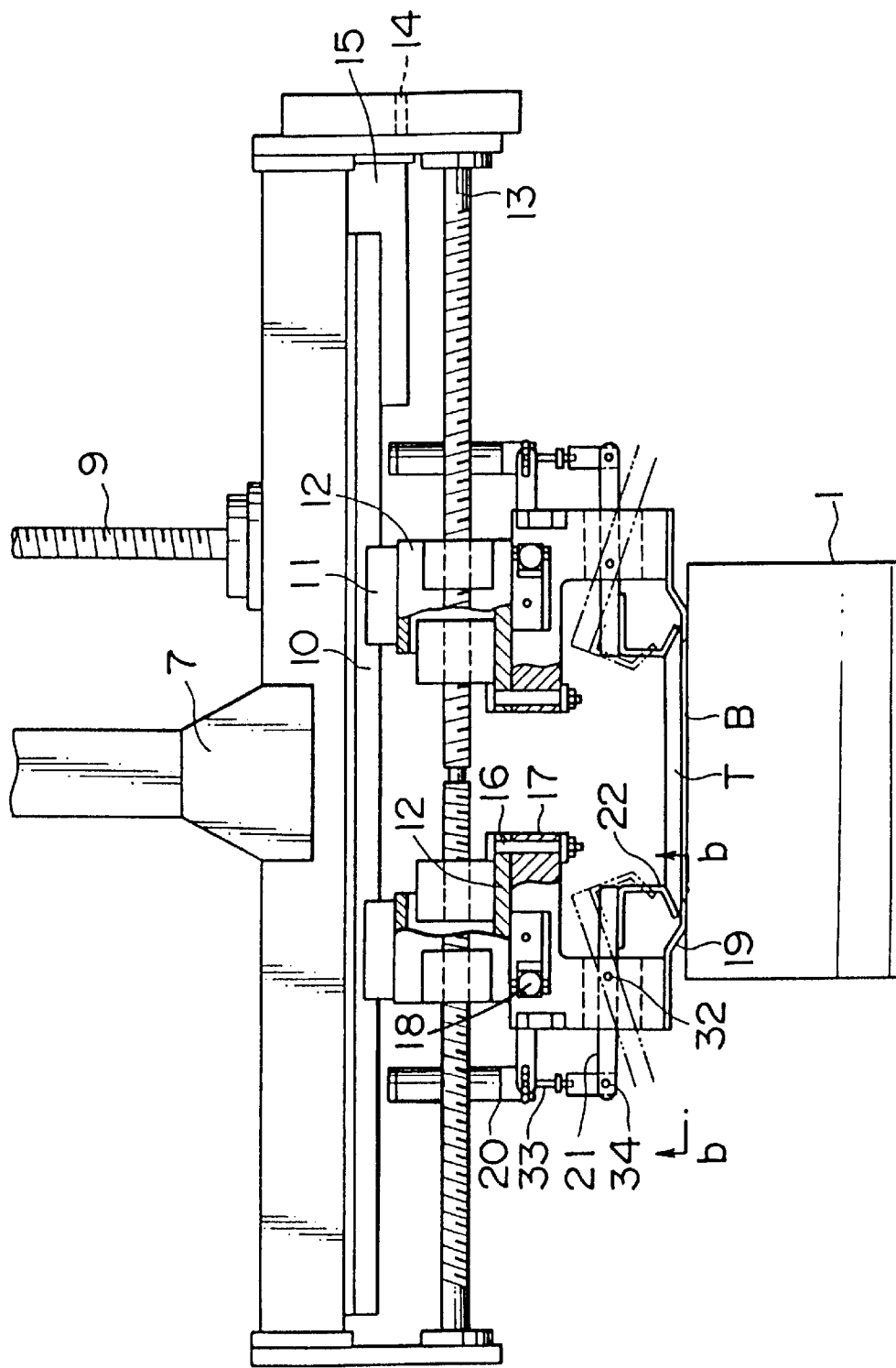
FIG. 2 is a front view taken along line a—a of FIG. 1.
Figure 3:
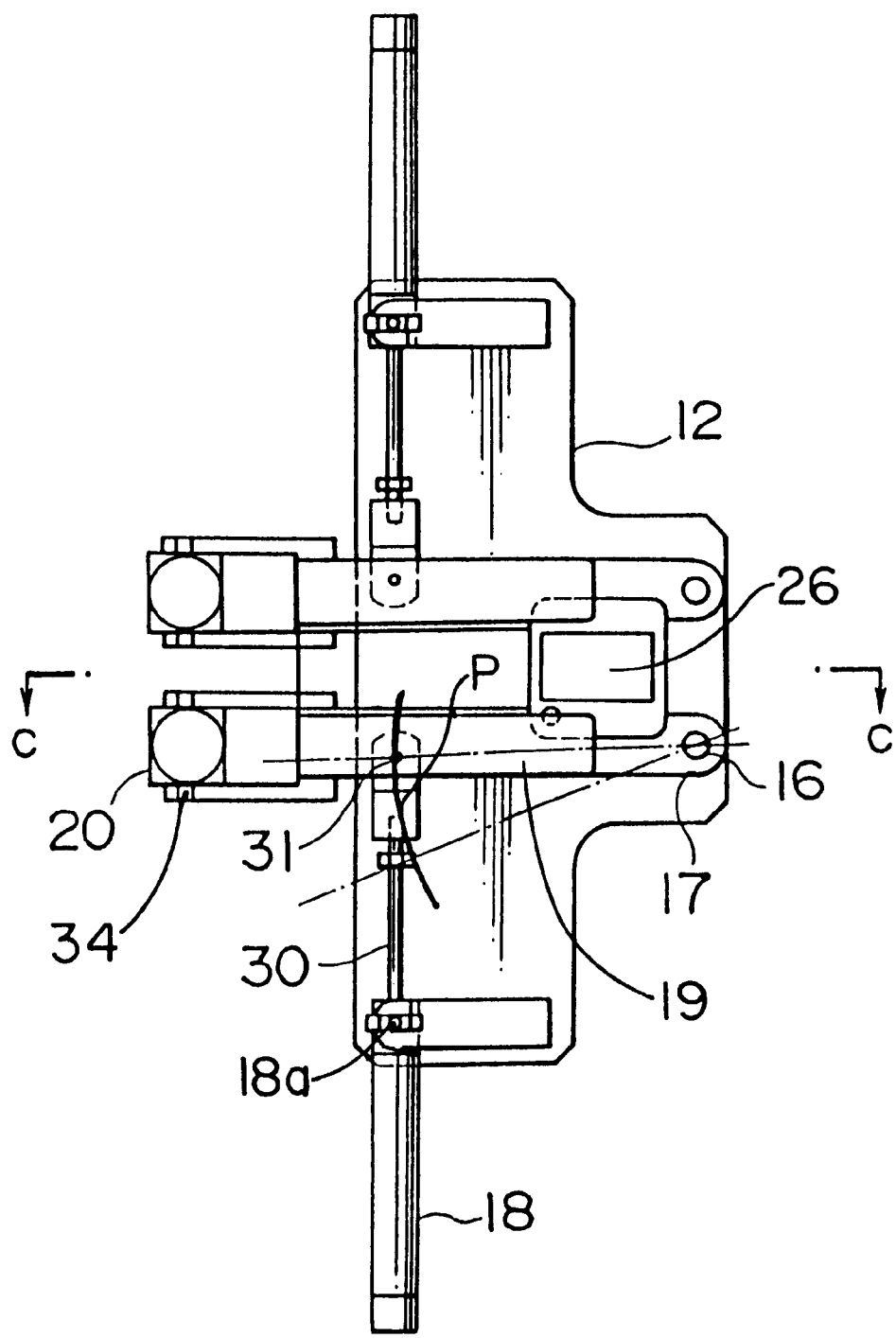
FIG. 3 is a bottom view taken along line b—b of FIG.2.

In FIG. 2, numeral 9 denotes a screw rod having an end fixedly mounted to the vertically moving base 7. A nut (not shown) engaged by the screw rod 9 is rotatably mounted to the bracket 5 and an endless belt is mounted between an output shaft of the motor 8 and said nut, so that rotation of the motor 8 is transmitted through the endless belt to the nut to rotate it for vertically moving the screw rod 9 together with the base 7.

Further, numeral 10 denotes a rail fixedly mounted to the vertically moving base 7 and numeral 12 denotes one of a pair of moving rests slidably mounted along the rail 10 through directly driven bearings 11. The moving rests 12 can be moved parallel to the axis of the tire forming drum 1, along the rail 10.

Numeral 13 denotes a screw rod which is arranged parallel to the rail 10 and has a left-handed screw portion and a right-handed screw portion. Both ends of the screw rod 13 are rotatably mounted to the vertically moving base 7 and respective nuts are fixedly mounted to the moving rests 12 for the engagement by the screw rod 13.

Numeral 15 denotes a motor fixedly mounted to the vertically moving base 7, which has an output shaft fixedly supporting a first pulley (not shown). An endless belt 14 is wound around the first pulley and also around a second pulley (not shown) fixed to one end of the screw rod 13, so that rotation of the motor 15 is transmitted to the screw rod 13 through the first pulley, the endless belt 14 and the second pulley. The rotation of the screw rod 13 causes the sliding movement of both moving rests 12 along the rail 10, so that they approach or move away with respect to each other.

Numeral 17 denotes one of four L-shaped arms, a pair of L-shaped arms 17 being provided at each side of the belt-shaped member T. Each arm 17 is swingably mounted above a respective pin 16 associated to a moving rest 12 and arranged substantially in the radial direction with respect to the axis of the forming drum 1. In particular, each of the arms 17 can swing about the respective pin 16 and therefore about an axis substantially perpendicular to the peripheral surface of the forming drum 1.

Further, each arm 17 is provided with a holding device adapted to clamp a side end portion of the belt-shaped member T. In particular, as shown by FIG. 2, the holding device comprises for each arm 17 a lower holding pawl 19 mounted at a lower end portion of the respective arm 17, for example by means of screws. A pair of fluid pressure cylinders 18 (best shown in FIG. 3) are mounted to each of the moving rests 12 through respective pins 18a, and each fluid pressure cylinders 18 is coupled with one of the arms 17. A piston rod 30 extends from each cylinder 18 and has a tip coupled with the respective arm 17 through a pin 31 parallel to the pin 16 of the same arm 17. Each fluid pressure cylinder 18 can be extended or retracted in order to swingably move the respective arm 17 about its pin 16.

The aforesaid holding device further comprises for each arm 17 an upper holding pawl 22 supported at an inner end portion of a movable-lever 21. In particular, each lever 21 is swingably mounted at the center portion thereof to an arm 17 through a pin 32 transverse to the respective pin 16, in order that its upper holding pawl 22 can be moved with respect to the holding pawl 19 of the same arm 17. For this purpose, a fluid pressure cylinder 20 is mounted to each arm 17, each cylinder 20 having a piston rod 33, a tip of which is coupled with the outer end portion of the respective lever 21 through a pin 34 parallel to the pin 32 of that lever. By retracting or extending each fluid pressure cylinder 20, the respective lever 21 swings about the pin 32 so that the upper holding pawl 22 approaches or moves away with respect to the corresponding lower holding pawl 19.

Figure 4:
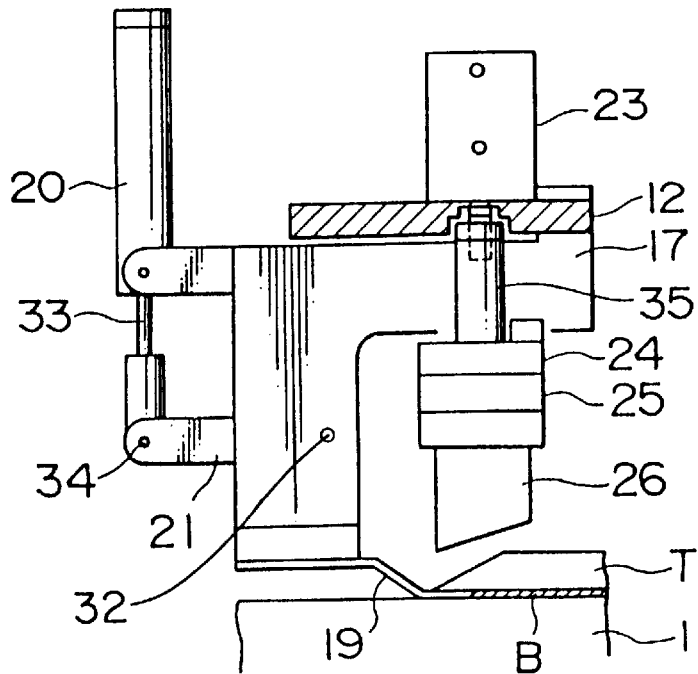
FIG. 4 is a side view taken along line c—c of FIG. 3.

In FIG. 4, numeral 26 denotes a pushing member or pusher associated to a respective moving rest and adapted for simultaneously pushing both side portions of the starting and terminating ends of the member T which are located at a same side of the member T, when they abut with each other. Numeral 23 denotes a fluid pressure cylinder fixedly mounted to one of the moving rests 12, having a piston rod 35 at a tip of which the respective pusher 26 is mounted through a guide block 24 and a spacer 25.

The operation of the both end joining apparatus for belt-shaped member shown in FIGS. 1 to 4 is described in detail in the following.

Figure 5:
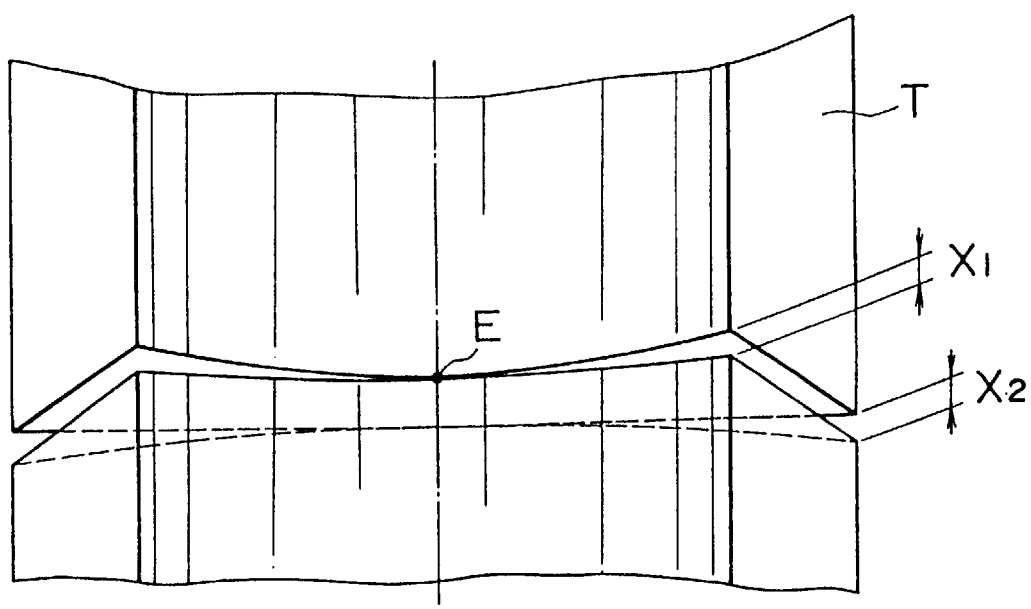
FIG. 5 is a schematic elevation view illustrating the ends of a belt-shaped member joined by a method according to the prior art.

A belt B (shown in FIGS. 2 and 4) is usually affixed on the peripheral surface of the tire forming drum 1. Then, a belt-shaped member T cut into a predetermined length is fed to the drum 1 from the feeding devices 3 and 4, and it is wound on the peripheral surface of the drum 1, and therefore on the belt B, so that the center portions of the starting end and of the terminating end of the belt-shaped member T are pushed and joined together by pushing means (not shown). As in the related art shown in FIG. 5, a pair of opposite V-shaped side gaps are formed between the side portions of the opposite ends of the belt-shaped member T, each V-shaped side gap having the vertex adjacent to the joined end center portions.

Referring back to FIGS. 2 and 4, the motor 15 is then driven and the rotation thereof is transmitted to the screw rod 13 through the first pulley, the endless belt 14 and the second pulley to rotate the screw rod 13, so that the moving rests 12 are moved from their waiting positions to the operative positions respectively approached to one of the side ends of the belt-shaped member T.

In the meanwhile, the fluid pressure cylinders 18 are operated for swinging the arms 17 about the respective pins 16 in order to open in a corresponding V-shaped configuration each pair of arms 17 associated to a same moving rest 12. In this way, the lower holding pawls 19 of the arms 17 are each inserted between a side portion of the belt-shaped member T and the tire forming drum 1, in proximity of the starting and terminating ends of the member T and therefore adjacent to the edges of the V-shaped gaps.

The fluid pressure cylinders 20 are then operated to swing the levers 21 so that their upper holding pawls 22 are moved down towards the respective lower holding pawls in order that both side portions of the starting and terminating ends of the belt-shaped member T are each clamped between an upper holding pawl 22 and a lower holding pawl 19.

Then, the fluid pressure cylinders 18 are operated in the opposite direction, for swinging the arms 17 about the pins 16 in order to move the arms 17 of each pair of arms associated to a same moving rest 12 toward each other in a closing direction, so that both side portions of the starting end and the terminating end of the belt-shaped member T are drawn near each other from their opened V-shaped configuration by the lower holding pawls 19 and the upper holding pawls 22, until their side ends abut against each other. In particular, under the operation of fluid pressure cylinders 18, each pair of holding pawl 19 and 22 is moved along an arcuate path P (shown in FIG. 3), the center of which is located at pin 16 which is substantially in correspondence with a location between the side portions of opposite ends of the belt-shaped member, e.g., substantially in correspondence with the vertex of the adjacent V-shaped gap, so that the opposite edges of each V-shaped gap are moved toward each other until they abut.

The fluid pressure cylinder 23 is then operated to move down the pusher 26 so that the side end portions of both starting and terminating ends of the belt-shaped member T are simultaneously pushed towards the surface of the drum 1 to be joined against each other.

Afterward, the fluid pressure cylinder 23 is operated in the opposite direction to raise the pusher 26, the upper holding pawls 22 are raised with respect to the lower holding pawls 19 for opening the holding devices, and the moving rests 12 are moved back to their waiting position. Thus, the winding and joining processes of the ends of the belt-shaped member T are completed.

In the foregoing description, the end side portions of the belt-shaped member T are spaced to form V-shaped gaps which are held and drawn toward each other by two sets of holding devices, i.e., a set for each of the opposite ends of the member T, each set comprising a pair of lower holding pawls 19 and corresponding upper holding pawls 22. However, a method according to the present invention can be also performed by fixedly holding and drawing the side portions of only one end of the member T with respect to the other end, and therefore by using only one set of holding devices.

According to a method and apparatus for joining together the opposite ends of the belt-shaped member according to the invention, the belt-shaped member cut into a predetermined length is fed from the feeding device to the tire forming drum to be wound on the peripheral surface of the drum and the center portions of the starting and terminating ends of the belt-shaped member are pushed and joined together. Then, both end side portions of at least one of the starting and terminating ends of the belt-shaped member are held by a pair of holding devices, each comprising an upper and a lower holding pawl, and such holding devices are swung along arcuate paths having the respective center located in proximity of the vertex of the adjacent V-shaped gap, so that both ends of the starting and terminating ends of the belt-shaped member are drawn toward each other until they abut against each other.

Thereafter, because the abutted end portions can be pushed towards the surface of the drum to be joined to each other, the starting and terminating ends of the belt-shaped member, such as a tire tread, can be automatically and accurately joined.

We claim:

1. A method for joining together opposite ends of a tread member for a tire wherein each of said ends comprises an end center portion interposed between two side portions, the method including the steps of:

feeding said tread member cut into a predetermined length to a tire forming drum which is rotatable about an axis, the drum having a cylindrical peripheral surface;

winding said tread member on said cylindrical peripheral surface of said tire forming drum;

pushing both end center portions of said opposite ends toward each other to join them together, whereby a pair of opposite substantially V-shaped side gaps between the side portions of the opposite ends of the tread member are formed, said V-shaped side gaps each having a respective vertex adjacent to the joined end center portions;

holding both side portions of at least one of said opposite ends of the tread member by respective holding devices arranged in proximity of said V-shaped side gaps;

swinging said holding devices each along an arcuate path along respective axes of said holding devices which extend radially with respect to the axis of the drum, so that the respective axes of the holding devices pass through respective points located substantially between the side portions of the opposite ends of the tread member, the center of said arcuate path being located substantially in correspondence with a location between the side portions of opposite ends of the tread member, to move the side portions of both the opposite ends of said tread member until they abut against each other.

2. The method of claim 1 wherein the center of said arcuate path is located at a radial extension of the vertex of the respective V-shaped gap.

3. The method of claim 1 wherein said side portions of each said end of said tread member are thinner than the corresponding end center portion.

4. A method according to claim 1, further comprising the step of pushing the abutting side portions of the opposite ends of said tread member toward the peripheral surface of said tire forming drum to join together the abutting side portions.

* * * * *